United States Patent [19]

Klemann et al.

[11] Patent Number: 5,064,678

[45] Date of Patent: Nov. 12, 1991

[54] LOW CALORIE FAT MIMETICS

[75] Inventors: Lawrence P. Klemann, Somerville; John W. Finley, Whippany, both of N.J.

[73] Assignee: Nabisco Brands, Inc., Parsippany, N.J.

[21] Appl. No.: 511,587

[22] Filed: Apr. 20, 1990

Related U.S. Application Data

[63] Continuation-in-part of Ser. No. 365,745, Jun. 13, 1989, abandoned, and a continuation-in-part of Ser. No. 411,913, Sep. 25, 1989, Pat. No. 4,963,386.

[51] Int. Cl.$^5$ .................... A23D 7/00; A23L 1/00
[52] U.S. Cl. .................... 426/611; 426/601; 426/612; 426/613; 426/804; 426/549; 426/570; 426/582; 426/589; 426/633; 426/592; 426/659; 426/635; 426/572; 426/565; 426/560; 426/564; 426/603; 426/583; 426/585; 426/580
[58] Field of Search ............ 426/549, 560, 564, 583, 426/580, 572, 601, 565, 611, 585, 804, 603, 612, 613, 570, 582, 589, 633, 592, 659, 635; 560/201, 199; 260/410.8, 410.7, 484 R, 484 A

[56] References Cited

U.S. PATENT DOCUMENTS 2,531,801  6/1946  Blake .
3,227,559  1/1966  Radlove .
3,846,479  11/1974  Zech .
3,929,870  12/1975  David et al. .
4,029,451  6/1980  Hameyer et al. .
4,169,102  9/1979  Hameyer et al. .

OTHER PUBLICATIONS

Chemical Abstracts 66956 (1941).
Arch. Biochem 14:117–24 (1947).
Rehberg et al., "Plasticizers from Lactic Esters and Dibasic Acids", Ind. and Eng. Chem., Sep. 1952, vol. 44, No. 9, 2191–95.
Chemical Abstracts 15118 (1956).
Chemical Abstracts 13926 (1956).
Chemical Abstracts 76097f (1956).

Primary Examiner—Marianne Cintins

[57] ABSTRACT

Novel fat mimetic compositions are disclosed to be useful in reduced calorie foods. These compounds, which can be referred to as linked esters, consist of linked multi-ester or mult-ester/ether fragments joined by a polycarboxylate. These complex linked esters may be partially broken down in the body to produce digestion residues which are substantially nondigestible themselves and are sufficiently hydrophilic to enable the digestion residues to be incorporated in the normal stool. These fat mimetic compounds are useful as replacements for fats and oils for most food applications.

32 Claims, No Drawings

LOW CALORIE FAT MIMETICS

This is a continuation-in-part application of U.S. Pat. application Ser. No. 07/365,745, filed on June 13, 1989, now abandoned and U.S. Pat. application Ser. No. 07/411,913, filed on Sept. 25, 1989, now U.S. Pat. No. 4,963,386.

BACKGROUND OF THE INVENTION

The present invention relates to edible fat mimetic materials, and especially to new compounds which have a desirable combination of properties and their use in edible compositions.

Obesity is perceived as a common problem in contemporary society. This condition is due, in many people, to a greater intake of calories than are expended. While genetic and behavioral factors play a major role, it is generally agreed that reasonable modifications of the caloric value of foods can be valuable in reaching a more desirable equilibrium weight for an individual predisposed to obesity.

Many foods which provide gustatory satisfaction contain significant fat levels. This can be a problem for individuals drawn to these foods because fat has about twice the caloric density of protein and carbohydrates. It has, in fact, been estimated that fat contributes about 40% of the total calories in the diet. It has long been desired to reduce the available calories of dietary fat without decreasing the appeal or satiety expected of fatty foods. It has been reported that this would offer a convenient and practical method by which obesity could be controlled, ideally without requiring a dieter to restrict total food intake.

Unfortunately, of the materials heretofore suggested as fat replacements, few have all of the desirable attributes of natural triglyceride fats and oils. One approach to lower the caloric value of edible fat has been to decrease the amount of triglyceride that is absorbed in the human system since the usual edible triglyercide fats are almost completely absorbed (see *Lipids*, Vol. II, J.H. Deuel, Interscience Publishers, Inc., New York 1955, page 215). The absorbability of triglyceride fat could be decreased by altering either the alcohol or the fatty acid portion of the molecule. There have been some experiments that have demonstrated a decrease in absorbability with certain fatty acids; for example, erucic acid (H.J. Deuel, A.L.S. Cheng, and M.G. Morehouse, *Journal of Nutrition*, Vol. 35, 1948, page 295), and stearic acid if present as tristearin (F.H. Mattson, *Journal of Nutrition*, Vol. 69, 1959, page 338). Also, U.S. Pat. No. 2,962,419, to Minich discloses that fatty acid esters which contain a neopentyl nucleus are not digested like normal fats and thus can be used as fat substitutes in food compositions.

Several other patents disclose edible compounds which are not digested or absorbed to the same extent as natural triglycerides. In U.S. Pat. No. 3,579,548, White discloses certain glycerol esters of certain branched carboxylic acids which are said to have these properties. And, in U.S. Pat. No. 3,600,186, Mattson and Volpenhein disclose sugar and sugar alcohol fatty acid esters having at least four fatty acid ester groups. All of these compounds are said to possess physical properties similar to ordinary triglyceride fat, but are absorbed less readily when eaten. It is, unfortunately, this very attribute which causes undesirable and potentially embarrassing side effects, including the frank anal discharge of the materials.

In a greater departure from conventional glyceride ester chemistry, Canadian Pat. No. 1,106,681 to Trost discloses glycerol dialkyl ether compounds which are said to have functional properties similar to those of conventional fats, but which are not absorbed in the digestive tract to any significant degree. Also, Ward, Gros, and Feuge have reported in New Fat Products: Glyceride Esters of Adipic Acid, *JAOCS*, Vol. 36, 1959, page 667 that highly viscous oils formed by reacting two glycerol molecules with a dibasic acid, such as fumaric, succinic, and adipic acids, and then reacting one of the hydroxyl groups of each glycerol moiety with a fatty acid, are useful in the food industry, primarily as lubricants and coatings.

In U.S. Pat. No. 4,508,746, Hamm discloses a low-calorie substitute for at least a portion of the edible oil component in oil-based food compositions, which low-calorie substitute is comprised in substantial proportion of at least one low-calorie oil component selected from the group consisting of thermally stable polycarboxylic acids having 2 to 4 carboxylic acid groups esterified with saturated or unsaturated alcohols having straight or branched carbon chains of from 8 to 30 carbon atoms. See, also, D.J. Hamm, Preparation and Evaluation of Trialkoxytricarballylate, Trialkoxycitrate, Trialkoxyglycerylether, Jojoba Oil, and Sucrose Polyester as Low Calories Replacements of Edible Fats and Oils, *J. of Food Science*, Vol. 49, 1984, pages 419–426.

In another attempt at simulating the natural properties of fat, Fulcher discloses certain diesters in U.S. Pat. No. 4,582,927. These compounds have at least two carboxylate groups joined to a common carbon atom, with each of the carboxylate groups containing the residue of a 12 to 18 carbon alkyl, alkenyl, or dienyl alcohol.

One of the main problems in attempting to formulate fat-like compounds that have decreased absorbability and thus low caloric properties is to maintain the desirable and conventional physical properties of edible fat. Thus, to be a practical low calorie fat, a compound must mimic conventional triglyceride fat by affording the same utility in various fat-containing food compositions such as shortening, margarine, cake mixes, and the like, and be useful in frying or baking. Unfortunately, none of the prior attempts has been successful to the degree that commercial products employing them have either been approved for safety or achieved general public acceptance in their featured role.

Among the problems with some non-absorbable fat-like materials is the possibility that they will leach fat-soluble vitamins and minerals from the body and that they function, when used in larger amounts, as purgatives. Many attempts have been made to solve these and related problems; however, a better solution would employ chemistry more compatible with the human digestive process, while providing a significant decrease in caloric density vis-a-vis glyceride fats.

SUMMARY OF THE INVENTION

The present invention provides a new class of fat mimetic compounds, new food compositions which contain them, and the process of employing these compounds in food compositions. These compositions, which are here referred to as complex linked esters, consist of linked multi-ester or multi-ester/ether fragments joined by a polycarboxylate. These complex linked esters may be partially broken down in the body to produce digestion residues which are substantially non-digestible themselves and are sufficiently hydrophilic to enable the digestion residues to be incorporated in the normal stool. These fat mimetic compounds are useful as replacements for fats and oils for most food applications.

The fat mimetic compounds can be defined by the following formula

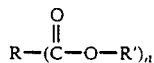

wherein R is a linking covalent bond or saturated or unsaturated aliphatic or glycolic group; n is 2 to 6; and the R' groups comprise residues defined by the following formula

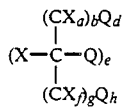

where C is a carbon atom;

X is a bridging bonding valence, hydrogen, or substituted or unsubstituted lower aliphatic group (e.g., $C_1$–$C_4$), the various X groups being the same or different;

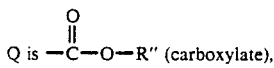

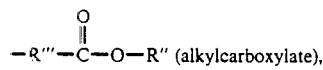

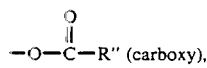

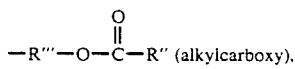

—O—R″ (alkoxy), or —R‴—O—R″ (alkylalkoxy) radicals, with the proviso that at least one of the Q radicals be other than carboxy;

R″ is a substituted or unsubstituted aliphatic, ether, or ester group, containing no more than 30 carbons, the various R' and R″ groups, respectively, being the same or different;

R‴ is a lower alkylene, desirably methylene or ethylene, preferably methylene, group which can be the same or different;

with the proviso that there is only one bridging bonding valence per R' group; and where a = 0 to 3, preferably 0 to 2;
b = 0 to 4, preferably 0 to 1;
d = 0 to 2, preferably 1 to 2;
e = 0 to 5, preferably 1 to 2;
f = 0 to 3, preferably 0 to 2;
g = 0 to 4, preferably 0 to 1;
h = 0 to 2, preferably 1 to 2.

Each R' group must contain at least one Q radical. Preferably, each R' group will contain from 1 to 3, most desirably 2, Q radicals.

The compounds are employed in any edible material or any food preparation process where a fat or oil (i.e., triglyceride fat) is normally employed, in total or partial replacement.

By judicious selection of the structural type, molecular size and the number of acid residues, it is possible to achieve a target reduction in calories while preferably achieving the maximum advantage from the combination of the properties of these mimetics.

DETAILED DESCRIPTION

The following description relates to a new class of fat mimetic compounds and their incorporation into any food product or use in conjunction with any edible material. The term "edible material" is broad and includes anything edible, whether or not intended for nutrition, e.g., it can be an additive such as an antioxidant for fats or oils, an antispatter agent, an emulsifier, or other minor functional ingredient. Thus, chewing gum, flavored coatings, oils and fats intended only for frying, and the like are included. In these, all or a portion of the usual fat is replaced by a compound of the invention.

Representative of food products which can contain the fat mimetic compounds of the invention in full or partial replacement of natural fat are: frozen desserts, e.g., sherbert, ice cream, ices, or milk shakes; puddings and pie fillings; margarine substitutes or blends; flavored bread or biscuit spreads; mayonnaise; salad dressing, both emulsified and non-emulsified; filled dairy products such as filled cream or filled milk; dairy or non-dairy cheese spreads; peanut butter; egg substitutes; coffee lighteners, liquid and dried; flavored dips; frying fats and oils; reformed and comminuted meats; meat substitutes or extenders; whipped toppings; compound coatings; frostings and fillings; cocoa butter replacements or blends; candy, especially fatty candies such as containing peanut butter or chocolate; chewing gum; bakery products, e.g., cakes, breads, rolls, pasteries, cookies, biscuits, or savory crackers; mixes or ingredient premixes for any of these; as well as flavor, nutrient, drug, or functional additive delivery systems.

The fat mimetics of the invention can be employed in margarine substitutes which can be either soft or hard. Margarines are generally sold as one of two principal types: namely, (1) print, hard or stick margarine and (2) soft or tub margarine. All of these products contain liquid and hard stock components which can be replaced by fat mimetics of the invention. It is an advantage of the present invention that, by eliminating some or all of the hard stock of conventional margarines, higher ratios of polyunsaturated to saturated fatty acids and lesser amounts of trans isomers can be achieved in high quality margarine products.

The fat mimetic compounds of the invention will be referred to as "complex linked esters" and can be defined by the following general formula:

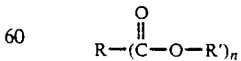

wherein the R is a linking covalent bond or saturated or unsaturated aliphatic or glycolic group, preferably with up to carbons, most preferably 1 to 8 carbons; n is 2 to 6, and preferably 2 to 4; and the R' groups can be the same or different and comprise residues defined by the following

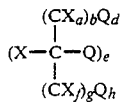

where C is a carbon atom;

X is a bridging bonding valence, hydrogen, or substituted or unsubstituted bridging or terminal lower aliphatic group (e.g., $C_1$–$C_4$), the various X groups being the same or different, wherein at least one X is a bridging bonding valence or a substituted or unsubstituted bridging lower aliphatic group;

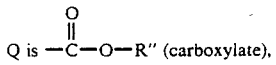

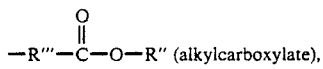

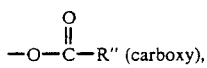

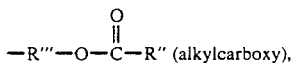

—O—R″ (alkoxy), or —R‴—O—R″ (alkylalkoxy) radicals, with the proviso that at least one of the Q radicals be other than carboxy;

R″ is a substituted or unsubstituted aliphatic, ether or ester group, containing no more than 30 carbons, e.g.,

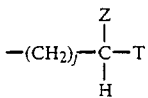

the various R′ and R″ groups, respectively, being the same or different;

R‴ is a lower alkylene, desirably methylene or ethylene, preferably methylene, group which can be the same or different;

T is hydrogen or a substituted or unsubstituted aliphatic group, e.g., no greater than 22 carbons, containing 0 to 5 unsaturated linkages (e.g., C═C double bonds, or C≡C triple bonds) per T residue;

Z is a bridging bonding valence, hydrogen, or an alcohol, glycol, ester, e.g.,

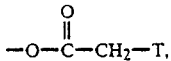

ether, or the like, residue;

with the proviso that there is only one bridging valence or group per R′ group; and where:
 a=0 to 3, preferably 0 to 2;
 b=0 to 4, preferably 0 to 1;
 d=0 to 2, preferably 1 to 2;
 e=0 to 5, preferably 1 to 2;
 f=0 to 3, preferably 0 to 2;
 g=0 to 4, preferably 0 to 1;
 h=0 to 2, preferably 1 to 2;
 j=0 to 10, preferably 0 to 3.

Each R′ group must contain at least one Q radical. Preferably, each R′ group will contain from 1 to 3, most desirably 2, Q radicals.

Where Q groups are carboxy or alkylcarboxy, they can be fatty acid residues which are preferably derived from natural fat. The term "fatty acid" used here means an organic fatty acid of the formula RCOOH containing 2 to 30 carbons, and may be synthetic or natural, saturated or unsaturated, with straight or branched chains. Examples of fatty acids are acetic, propionic, butyric, caproic, caprylic, pelargonic, capric, undecanoic, lauric, myristic, palmitic, margaric, stearic, arachidic, behenic, lignoceric, cerotic, montanic, mellissic, palmitoleic, oleic, vaccenic, linoleic, linolenic, eleostearic, arachidonic, nervonic, eicosapentaenoic, decosatetraenoic, decosapentaenoic, decosahexaenoic, and the like acids. Mixtures of fatty acids may also be used, such as those derived from non-hydrogenated, partially hydrogenated or fully hydrogenated soybean, safflower, sunflower, sesame, peanut, corn, olive, rice bran, canola, babassu nut, coconut, palm, palm kernel, lupin, nastrutium seed, mustard seed, cottonseed, low erucic rapeseed, butter or marine oils, or plant waxes such as jojoba. Specific fractions of natural or processed oils or waxes may also be used.

Fatty acids per se or naturally-occurring fats and oils can serve as the source for the fatty acid component in the complex linked ester. For example, rapeseed oil is a good source of $C_{22}$ fatty acids. $C_{16}$–$C_{18}$ fatty acids can be provided by tallow, soybean oil, or cottonseed oil. Shorter chain fatty acids can be provided by coconut, palm kernel, or babassu oils. Corn oil, lard, olive oil, palm oil, peanut oil, safflower seed oil, sesame seed oil, and sunflower seed oil, are examples of other natural oils which can serve as the source of the fatty acid component. Among the fatty acids, those utilized often include those selected from the group consisting of myristic, palmitic, stearic, oleic, and linoleic. Thus, natural fats and oils which have a high content of these fatty acids represent preferred sources for the fatty acid components, e.g., soybean oil, olive oil, cottonseed oil, corn oil, tallow, and lard. Advantageously, the fatty acids utilized are selected to provide the desired fatty characteristics to the fat mimetic compound.

Where the Q groups are carboxylate, alkylcarboxylate, alkoxy, or alkylalkoxy, they can be residues of fatty alcohols having saturated or unsaturated aliphatic groups (i.e., R″). The term "fatty alcohol" used here means an alcohol of the formula $RCH_2OH$. The fatty alcohol may be synthetic or natural, saturated or unsaturated, with straight or branched chains, and of the same chain length and configuration as the fatty acids discussed above, namely, derived from fatty alcohols having 2 to 30 carbon atoms. Examples of fatty alcohols include the fatty alcohol counterparts of the fatty acids enumerated above, namely, ethyl, propanyl, butyryl, hexyl, caprylyl, pelargonyl, capryl, lauryl, undecanyl, myristyl, palmityl, stearyl, arachidyl, behenyl, lignoceryl, cerotyl, montanyl, melissyl, palmitoleyl, oleyl, vaccenyl, linoleyl, linolenyl, eleostearyl, arachidyl, nervonyl, eicosapentaenyl, docosatetraenyl, docosapentaenyl, and docosahexaenyl alcohols. Mixtures of fatty alcohols may also be used, such as those obtained from the processed or unprocessed natural oils or waxes enumerated above, or specific fractions of the oils or waxes.

The particular types of fatty acids and alcohols can be selected to achieve the desired texture (both solid and liquid) and melt characteristics in the compound. In fact, certain of the inventive complex linked esters can be a liquid, yet upon hydrolyzation produce at least some solid fragments. Exemplary of such compounds are those having alkyl side chain (12), as disclosed hereinbelow, such as the fat mimetic compound of Example 9. These fat mimetics, thus, have all of the desirable properties of oils yet have reduced calories. Moreover, since at least some of the hydrolyzed fragments are solid, they can be used to reduce or prevent the frank anal discharge (i.e., anal leakage) which has been observed after the ingestion of some liquid fat mimetic compounds. This is especially useful where the fat mimetic compounds being ingested include sucrose polyesters, whose persistent anal leakage is notorious.

The complex linked esters of this invention ma be incorporated either alone, or in combination with another fat and/or fat mimetic, into any food composition or used in conjunction with any edible material. Other fat mimetics include any heretofore suggested edible fat replacements, including, but not limited to, sugar esters, neoalkyl esters, polyglycerol esters, malonate esters, propoxylated glycerols, retrofats, silicone oils/siloxanes, carboxy/carboxylates, and the like. These blends or combinations can be selected for a desired rheology, melt profile, and mouthfeel. This is especially desirable in the case of margarine substitutes, cookie fillings, whipped toppings, etc.

Among the esters preferred for many applications are those with melting points below about 98° F. because these materials melt in the mouth providing the organoleptic sensation of natural fats and oils. For some products, relatively sharp melting points, for instance in the range of from about 90° F. to about 98° F., are desired because they provide a cooling sensation and a meltdown equivalent to high quality, solid, natural fats.

The inventive complex linked esters may be partially broken down in the body to yield digestion residues which, preferably, are each more hydrophilic than the complex ester substrate. The majority by weight of the digestive residues will be non-hydrolyzable by normal digestive processes, while a minor amount by weight may be susceptible to facile cleavage by the action of digestive enzymes. The selection of the exact type of chemical bonds which will provide the desired proportions of hydrolytrically reactive versus "inert" sites is determined by experiment.

The fat mimetic compositions of the present invention include those of the general formula

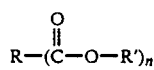

where R is a linking group selected from the group consisting of $-(CH_2)_m-$, where m is 1 to 8 and may be envisioned as simple alpha omega dicarboxylic acids; n is 2; and each R' is selected from the group consisting of

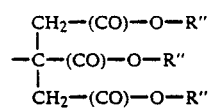 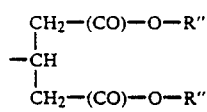

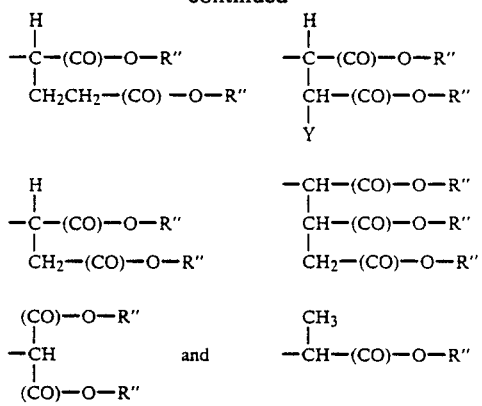

where R" is as defined above, $-CH(CH_3)CH_2O-A$ or $-CH_2CH(CH_3)O-$, $-O-A$, where A is an aliphatic group having 1 to 30 carbons, and Y is $-OH-(-CO)-R''$, or $-(CO)-O-R''$.

In addition, where each R' is different, each is, independently, selected from the group consisting of

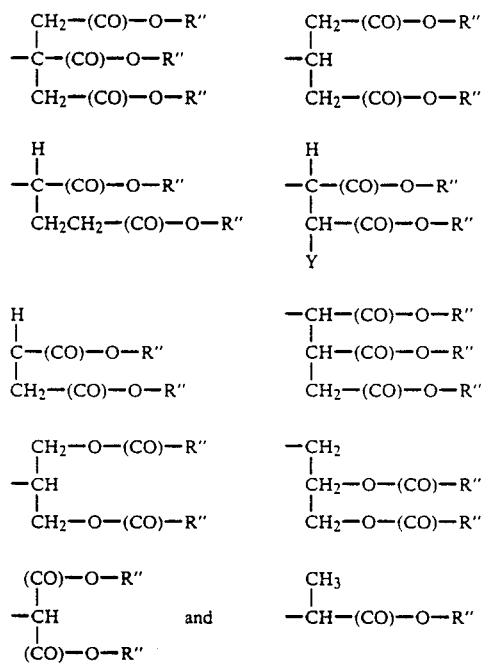

where R" and Y are as defined above.

Preferred among the R' groups are

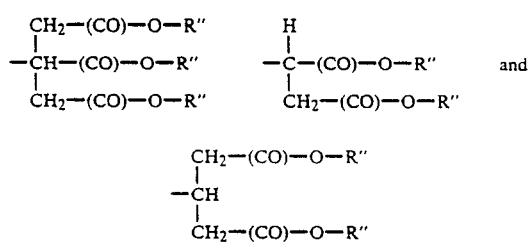

Moreover, R can be a linking group of the formula $-CH_2-O-CH_2$, which can be envisioned as glycolic acid, where each R' is, independently,

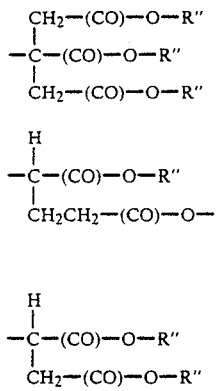
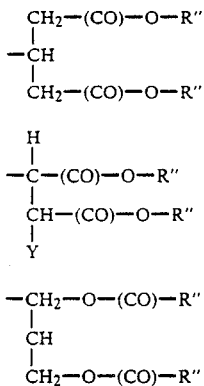
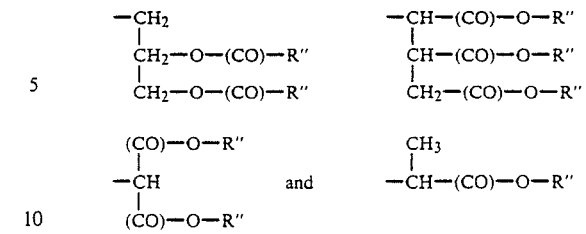
where R" and Y are as defined above.
Among the compositions of this invention are those which can be defined as symmetric dicarboxylate bridged structures (i.e., those wherein each R' is the same) as follows:
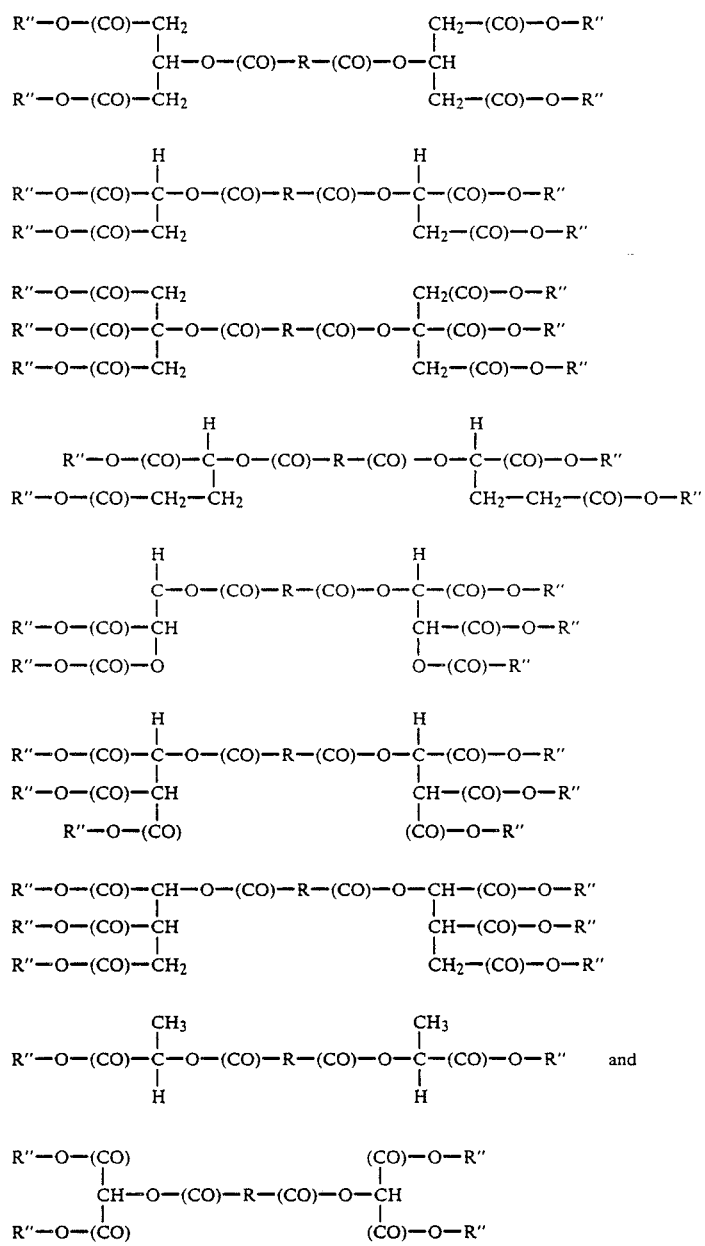
and asymmetric dicarboxylate bridged structures (i.e., those wherein each R' is different) as follows:

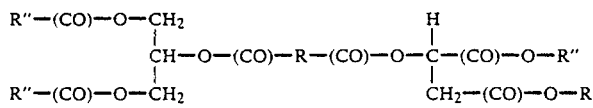
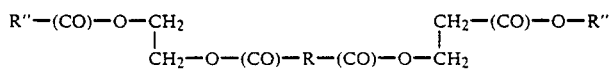
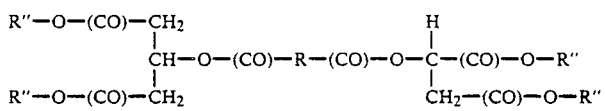
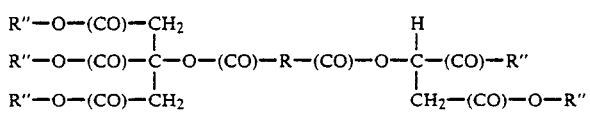
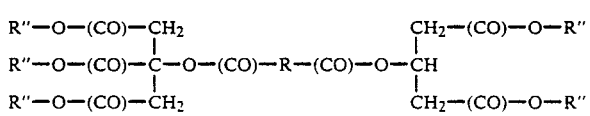
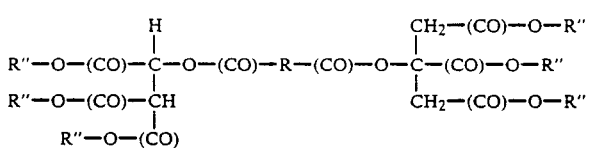
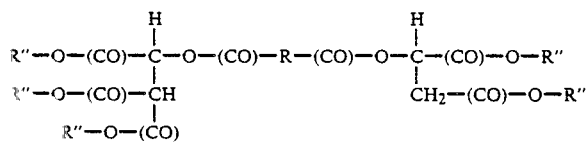
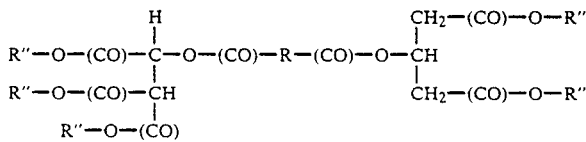
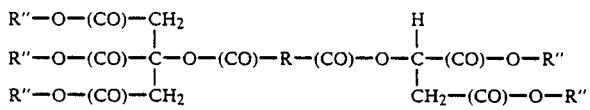
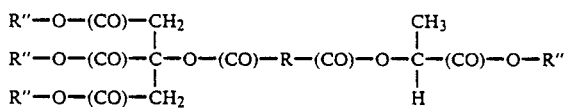
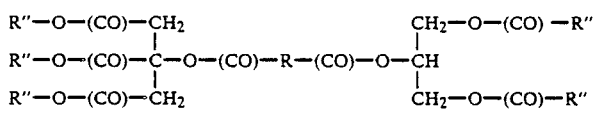
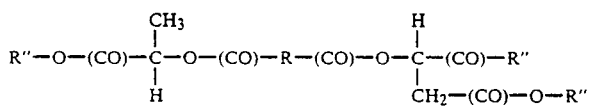
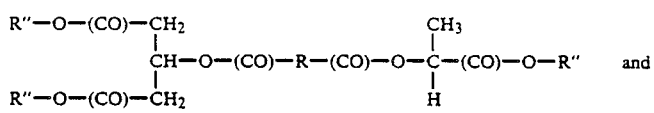

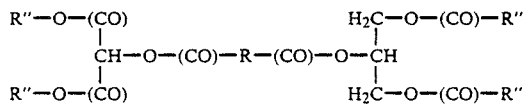

-continued wherein R is an aliphatic group having 1 to 8 carbons, preferably 2 to 4 carbons; and each R", independently, is an aliphatic group having 1 to 30 carbons.

The following is a list of representative, but non-limiting, examples of R' groups which can be linked to form the complex linked esters of the invention:

I. Reverse Ester Linkages

A. Alkyl Side Chains

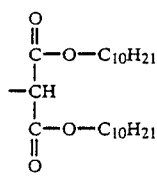 (1)

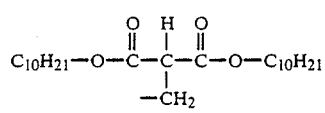 (2)

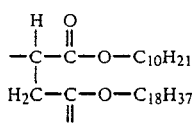 (3)

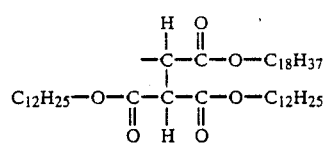 (4)

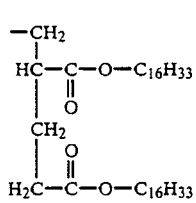 (5)

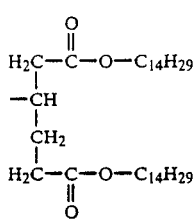 (6)

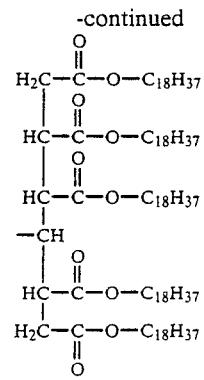 (7)

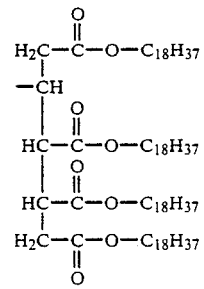 (8)

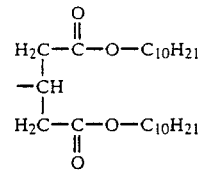 (9)

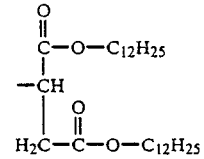 (10)

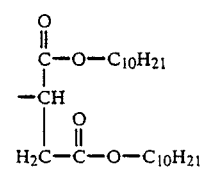 (11)

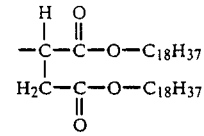 (12)

B. Alkenyl Side Chains

-continued
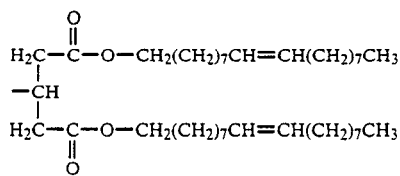 (13)
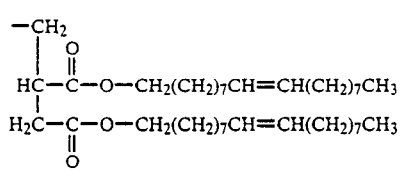 (14)
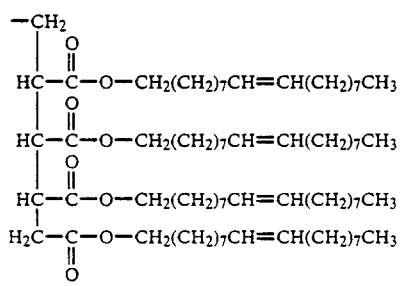 (15)
C. Mixed Alkyl/Alkenyl Side Chains
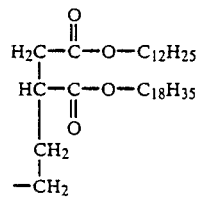 (16)
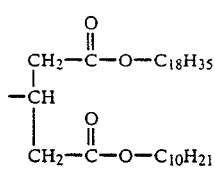 (17)
D. Miscellaneous Side Chains
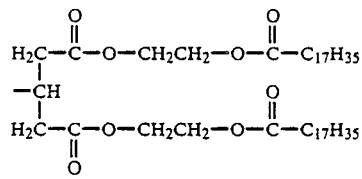 (18)
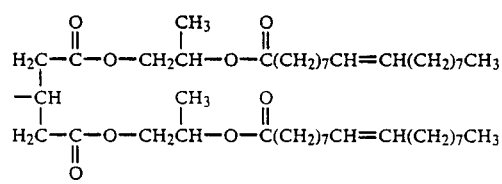 (19)
II. Normal Ester Linkages
A. Alkyl Side Chains
-continued
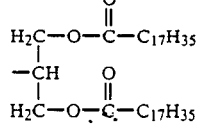 (20)
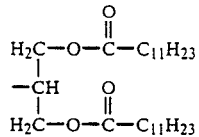 (21)
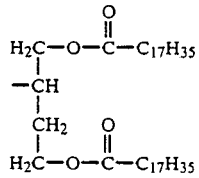 (22)
B. Alkenyl Side Chains
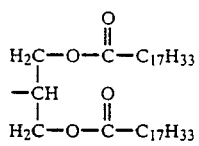 (23)
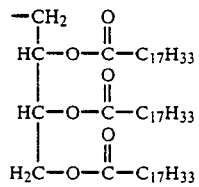 (24)
C. Alkyl/Alkenyl Side Chains
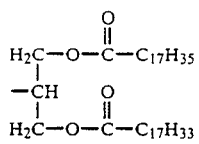 (25)
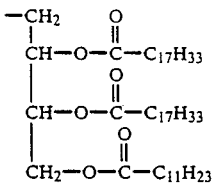 (26)
III. Normal Ester/Reverse Ester Linkage
A. Alkyl Side Chains
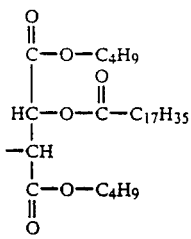 (27)

-continued

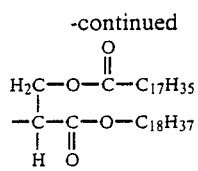
(28)

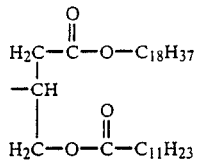
(29)

B. Alkenyl Side Chains

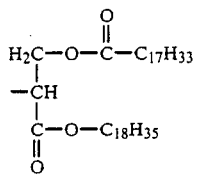
(30)

C. Mixed Alkyl/Alkenyl Side Chains

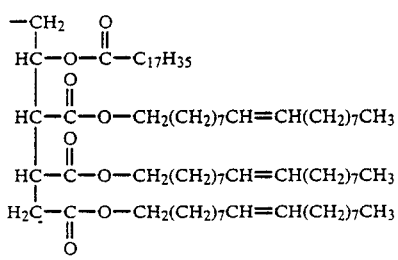
(31)

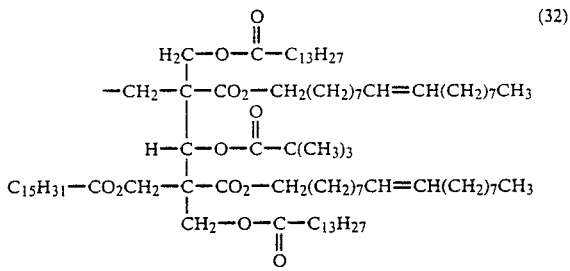
(32)

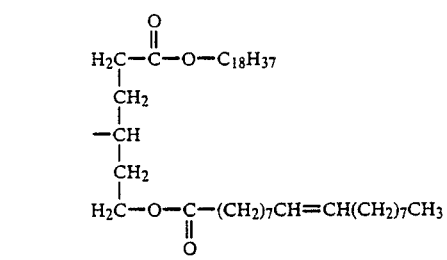
(33)

III. Ether Linkages
A. Ether Linkages Alone

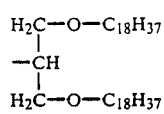
(34)

B. Mixed Ether/Ester Linkages

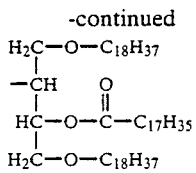
(35)

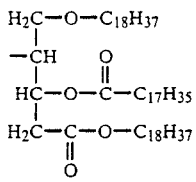
(36)

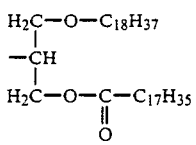
(37)

The preparation of the complex linked esters of the invention involves the reaction of complex alcohols of the formula R'OH, (such as, for instance, 2-hydroxyglutarate diester, 3-hydroxyglutarate ester, 2-hydroxysuccinate diester, 1-hydroxy-1,2,3-tricarboxy propane and 2-hydroxy-1,2,3-tricarboxy propane) with a polybasic compound effective to link the R' radicals to a common molecular framework. Among the polybasic compounds are: polybasic acids of the formula

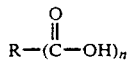

acid chlorides of the formula

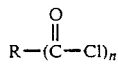

alkyl esters of the formula

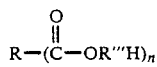

dibasic acid cyclic anhydrides of the formula

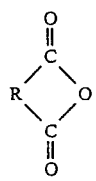

or mixed anydrides of a dibasic acid such as shown by the formula

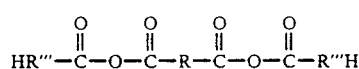

wherein R, R', R''', and n are as defined above. The reactions will typically proceed at approximately ambient or reduced pressure and at temperatures of from about 0° C. to 190° C. Solvents and/or catalysts may be employed to adjust the reaction rate and product recovery as desired.

Representative dibasic acids are saturated acids such as oxalic, malonic, succinic, glutaric, adipic, and unsaturated acids such as maleic, fumaric, citraconic, mesaconic, glutamic, aspartic, sebacic, and suberic. Representative of tribasic acids are citric, tricarballylic, cis, cis-1,3,5-cyclohexanetricarboxylic, cis-aconitic and trans-aconitic acids. Representative tetrabasic acids are methane tetracarboxylic acid and 1,1,2,2-ethane tetracarboxylic acid. Suitable anhydrous acid chloride, acid bromide, and lower alkyl ester forms of these acids can be employed as desired.

The following examples are presented to further illustrate and explain the present invention and should not be taken as limiting in any regard. Unless otherwise indicated, all parts and percentages are by weight.

EXAMPLE 1

This example shows the preparation, from intermediates to final molecular composition, of a fat mimetic material of the invention, having the following structure:

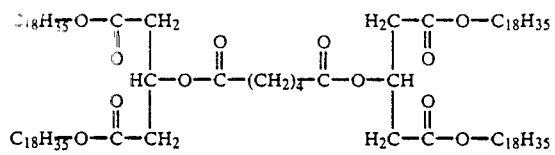

Dioleyl 3-oxyglutarate

Trichloroacetic acid (9.8 g, 0.06 mole), dimethyl 1,3-acetonedicarboxylate (139.3 g, 0.80 mole), and oleyl alcohol (451.1 g, 1.68 mole, 5 mole % excess) are combined in a 2000 mL flask fitted with a distillation head, thermometer, and Teflon coated stirrer bar. The apparatus is evacuated to about 150 mm Hg and is heated at 130° to 140° C. for 17 hours. A quantitative yield of clear orange oil is obtained. An nmr spectrum in deuterochloroform is consistent with the proposed structure; chemical shift in ppm (multiplicity, assignment, relative intensity): 5.35 (apparent triplet, HC=CH, 4 H), 4.13 (triplet, —O—CH$_2$—, 4 H), 3.61 (singlet, O=C—CH$_2$—C=O), 4 H), 2.01, 1.62, and 1.27 (multiplets, —CH$_2$—, 56 H), and 0.88 (triplet, —CH$_3$, 6 H); The product in chloroform-d exists as an equilibrium mixture of keto (about 68%) and enol (about 32%) tautomers which account for additional nmr singlets at 3.22 and 5.18 ppm in a ratio of 2:1, respectively.

Dioleyl 3-hydroxyglutarate

Sodium borohydride (46.36 g, 1.22 mole) in 800 mL of ice water and dioleyl 3-oxoglutarate (525.0 g, about 0.81 mole) in 800 mL diethyl ether are combined in a 3000 mL flask containing a magnetic stirrer bar and the two phase mixture is stirred vigorously at ambient temperature for 22.5 hours. The ether layer is separated, washed twice with 800 mL portions of 5% aqueous HCl, and washed twice with 800 mL portions of water. The ether solution is evaporated on a vacuum rotary evaporator to give 504.3 g (about 96% yield) of straw colored oil. Excess oleyl alcohol is removed by passage of the crude product through a falling film still (168° C., 0.8 mm Hg). An nmr spectrum of the final product is consistent with the title structure; chemical shift in ppm (multiplicity, assignment, relative intensity): 5.35 (apparent triplet, HC=CH, 4 H), 4.46 (quintet of doublets, methane H, 1H), 4.10 (triplet, —O—CH$_2$—, 4 H), 3.45 (doublet, —O—H, 1 H), 2.55 (doublet, HO—C—CH$_2$—C=O, 0, 4 H), 2.00, 1.63, and 1.26 (multiplets, —CH$_2$—, 56 H), and 0.88 (triplet, —CH$_3$, 6 H).

1:2 Adduct of Adipoyl chloride and Dioleyl 3-hydroxyglutarate

Dioleyl 3-hydroxyglutarate (32.45 g, 0.05 mole) and adipoyl chloride (4.58 g, 0.025 mole) are combined in a 100 mL flask containing a magnetic stir bar and sealed with a stopcock. The mixture is heated with stirring at 110–115° C. for 24 hours under 125 mm Hg vacuum. The reaction mixture at this point exhibits a weight loss which is consistent with the formation of HCl as a volatile reaction by-product. The nmr spectrum of the isolated, red orange oil in deuterochloroform is consistent with the 1:2 adduct structure; chemical shift in ppm (multiplicity, assignment, relative intensity): 5.51 (quintet, methine H, 2H), 5.35 (apparent triplet, HC=CH, 8 H), 4.07 (triplet, O=C—O—CH$_2$—, 8 H), 2.70 (doublet, HO—C—CH$_2$—C=O, 8 H), 2.29 (apparent triplet, O=C—CH$_2$— of adipate bridge, 4 H), 2.01, 1.62 and 1.31 (multiplets, —CH$_2$—, 116 H) and 0.89 (triplet, —CH$_3$, 12 H).

EXAMPLE 2

The process of Example 1 is repeated but this time employing glutaric anhydride and two equivalents of dioleyl 2-hydroxymethylmalonate to form a novel complex linked ester having the structural formula:

CH$_2$[CH$_2$CO$_2$CH$_2$CH-
(CO$_2$CH$_2$(CH$_2$)$_7$CH=CH(CH$_2$)$_7$CH$_3$)-$_2$]$_2$

EXAMPLE 3

The process of Example 1 can be repeated where the oleyl alcohol is replaced with myristyl alcohol to produce a fat mimetic compound of the formula:

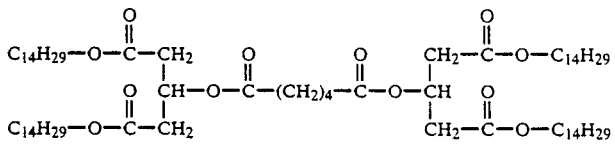

EXAMPLE 4

By essentially the same procedure as detailed in Example 1, sebacoyl chloride is reacted with two equivalents of dioleyl 2-hydroxymethylsuccinate to form a novel complex linked ester with a molecular formula of C$_{92}$H$_{166}$O$_{12}$.

EXAMPLE 5

This example shows the preparation, from intermediate to final molecular composition, of a fat mimetic material of the invention containing a linking dibasic acid unit and having the following structure:

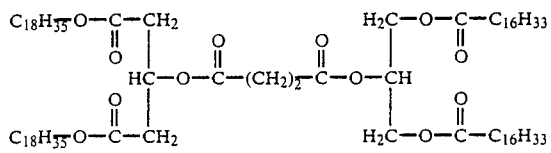

Mono-(dioleyl glutar-3-yl) succinate

A 500-mL round bottom flask, containing a magnetic stirrer bar, is charged with 62.2 g (0.096 mole) dioleyl 3-hydroxyglutarate, 13.8 g (0.14 mole) succinic anhydride, 3.2 g (0.026 mole) 4-(dimethylamino) pyridine and 200 mL of anhydrous pyridine. The resulting solution is stirred at ambient temperature for three days, and is poured into 1500 mL of water. This mixture is extracted with 4×400 mL portions of diethyl ether, and the combined extracts are washed with 5% aqueous HCl, and are dried over anhydrous $Na_2CO_3$. After filtration, the volatiles are removed on a vacuum rotary evaporator (45° C. and 100 Torr, then ambient temperature and 2 Torr). The yield of yellow oil is 58 g (82% of theory). The product is characterized by IR and NMR spectroscopy: IR, neat: 3.33–3.45 microns (very broad, —OH); 5.76 (strong, C=O); 6.29 (weak, C=C); 8.62 (strong, C—O); NMR, chloroform-d: 0.88 ppm (triplet, 6H, —$CH_3$); 1.30 (multiplet, 40H, —$CH_2$—); 1.61 (quintet, 4H, —O—$CH_2$—$CH_2$—$CH_2$—); 2.01 (multiplet, 8H, C=C—$CH_2$—); 2.65 (apparent doublet of doublets, 4H, O=C—$CH_2$—$CH_2$—C=O); 2.71 (doublet, 4H, O=C—$CH_2$—CH—$CH_2$—C=O); 5.35 (multiplet, 4H, HC=CH); and 5.53 (quintet, 1H, —$CH_2$—CH—$CH_2$—).

Elemental Analysis: Calc. for $C_{45}H_{80}O_8$, FW 749.12: C 72.15, H 10.76; Found: C 72.15, H 10.87.

Mono-(dioleyl glutar-3-yl) succinoyl monochloride

A portion of the above acid ester (58.0 g, 0.0793 mole) and 200 mL of thionyl chloride are charged to a 500-mL round bottom flask, containing a magnetic stirrer bar, and fitted with a drying tube filled with Drierite. The reaction mixture is stirred at room temperature for 24 hours, whereupon the volatiles are removed on a vacuum rotary evaporator (60° C. and 100 Torr) to afford 59 g (99%) of a dark brown, viscous oil, whose structure is supported by its NMR spectrum: NMR, chloroform-d: 0.88 ppm (triplet, 6H, —$CH_3$); 1.30 (multiplet, 40H, —$CH_2$—); 1.61 (quintet, —O—$CH_2$—$CH_2$—$CH_2$—); 2.01 (multiplet, 8H, C=C—$CH_2$—); 2.65 and 3.20 (apparent triplets, 2H and 2H, O=C—$CH_2$—$CH_2$—C=O); 2.72 (doublet, 4H, O=C—$CH_2$—CH—$CH_2$—C=O); 4.07 (triplet, 4H, O—$CH_2$—); 5.35 (multiplet, 4H, HC=CH); and 5.56 (quintet, 1H, —$CH_2$—CH—$CH_2$—).

Elemental Analysis: Calc. for $C_{45}H_{79}ClO_7$ FW 767.57: C 70.42, H 10.37, Cl 4.62; Found: C 67.69, H 10.01, Cl 7.30. The elemental analysis, including the higher than expected value determined for chlorine is consistent with product contamination with 0.57 wt % (or 4.1 mole%) thionyl chloride.

1:1 adduct between mono-(dioleyl glutar-3-yl) succinoyl mono-chloride and 1,3-dipalmitoyl glycerol In a dry, 250-mL, single neck flask containing a magnetic stirrer bar and fitted with a thermometer and a vacuum stopcock are combined 56.9 g (0.1 mole) 1,3-dipalmitoyl glycerol and a 76.8 g portion (0.1 mole) of mono-(dioleyl glutar-3-yl) succinoyl monochloride prepared above. The flask is sealed and placed under vacuum while being heated to 110° C. by means of a heating mantle. The mixture is heated with stirring for sufficient time to yield substantial conversion of reactants to product. After cooling to ambient temperature, the product is characterized by proton NMR spectroscopy (in chloroform-d). The result is consistent with formation of the expected 1:1 adduct between the triester acid chloride and the dipalmitin.

EXAMPLE 6

In this example, the process of Example 1 is repeated where the adipoyl chloride in Example 1 is replaced with the diacid chloride of diglycolic acid to produce the following compound was prepared by the process described below:

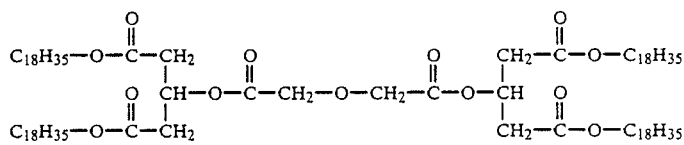

EXAMPLE 7

In this example, the following compound was prepared by the process described below:

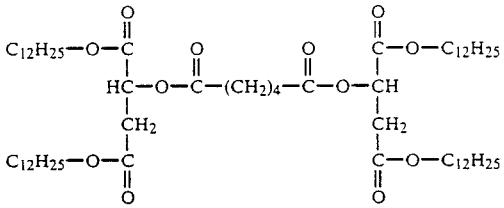

Didodecyl 2-hydroxysuccinate

Trichloroacetic acid (13.2 g., 0.08 mole), 302.2 g (2.25 mole) D,L-malic acid and 931.9 g (5.00 mole) dodecanol are combined in a 3000-mL flask containing a magnetic stirrer bar and fitted with a thermometer and a vacuum distillation head. The apparatus is placed under 170 Torr vacuum and warmed to 135° for 6.5 hours. Water distills from the reaction mixture under these conditions. The reaction mixture is cooled to 60° C., and is passed twice through a falling film still (168° C., 0.8 Torr) to give 935.6 (88%) of the title composition as a white solid, mp 27–30° C. Proton nmr spectrum in $CDCl_3$: chemical shift in ppm (multiplicity, intensity, assignment): 4.49 (doublet of doublets J=6.0, 4.5 Hz, 1 H, methine proton), 4.20 (overlapping triplets, 2H, O—$CH_2$), 4.11 (triplet, 2 H, O—$CH_2$), 2.86 (doublet of doublets J=16.5, 4.5 Hz, 1 H, half of O=C—C—$CH_2$—C=O), 2.78 (doublet of doublets J=16.5, 6.0 Hz, 1 H, half of O=C—C—$CH_2$—C=O), 1.64 (multiplet, 4

H, O—C—CH$_2$), 1.29 (multiplet, 36 H, —CH$_2$—) and 0.89 (triplet, 6 H, —CH$_3$). The chemical shift for the hydroxyl proton is seen at 2.93 (broad singlet, 1 H, OH) in preparations carried out with sulfuric acid catalyst. Reaction is also completed in the absence of a catalyst.

Analysis: calc for C$_{28}$H$_{54}$O$_5$, FW 470.73: C 71.44, H 11.56, O 17.00%.

Bis-(didodecyl 2-succinyl) adipate

Didodecyl 2-hydroxysuccinate (1101.7 g, 2.34 mole) is melted by warming to about 65° C. and is combined with 214.2 g (1.17) mole) adipoyl chloride in a 2000-mL flask containing a magnetic stir bar and fitted with a thermometer and a vacuum distillation head which is connected to a trap containing 110 g KOH. The reaction mixture is placed under vacuum 200 Torr) and evolution of HCl begins. After one hour, external heat is applied to raise the temperature to 73° C. After stirring under vacuum at this temperature overnight, the temperature is raised to 115° C. for two hours. The product is then transferred to a steam deodorizer and is stripped with steam at 190° C. and 0.5 Torr to give a clear, pale yellow oil (yield: 1194.0 g, 97%). Proton nmr spectrum in CDCl$_3$: chemical shift in ppm (multiplicity, intensity, assignment): 5.47 (triplet, 2 H, methine proton), 1.14 and 4.10 (overlapping triplets, 8 H, O—CH$_2$), 2.88 (doublet, 4 H, O=C—CH$_2$—C=O), 2.40 (multiplet, 4 H, adipate O=C—CH$_2$, 1.70 and 1.62 (multiplets, 12 H, adipate O=C—C—CH$_2$ and dodecyl O—C—CH$_2$), 1.30 (multiplet, 72 H, CH$_2$) and 0.88 (triplet, 12 H, CH$_3$).

EXAMPLE 8

In this example, the process of Example 7 is repeated where the dodecanol of Example 1 is replaced with oleyl alcohol.

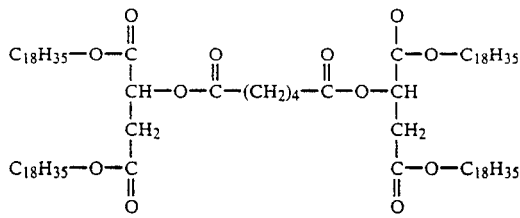

Any of the fat mimetic compounds produced in Examples 1–8 can be used in foods. Improved quality of these compounds for such purposes can be achieved through use of one or more conventional edible oil refining techniques including: filtration, clay bleaching, steam deodorization, alkali refining, centrifugation, acid washing, molecular distillation, etc.

EXAMPLE 9

This example shows the preparation, from intermediates to final molecular composition, of a fat mimetic material of the invention, having the following structure:

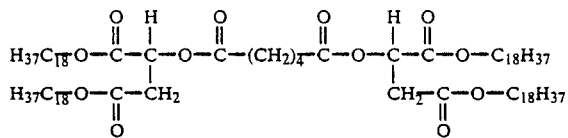

Distearyl Malate

Tricholoroacetic acid (9.8 g, 0.06 mole), dimethyl malate (139.3 g, 0.80 mole), and stearyl alcohol (451.1 g, 1.68 mole, 5 mole % excess) are combined in a 2000 mL flask fitted with a distillation head thermometer, and Teflon coated stirrer bar. The apparatus is evacuated to about 150 mm Hg and is heated at 130° to 140° C. for 17 hours. A quantitative yield of clear oil is obtained.

1:2 Adduct of Adipoyl chloride and Dioleyl 3-hydroxyglutarate

Distearyl malate (32.45 g, 0.05 mole) and adipoyl chloride (4.58 g, 0.025 mole) are combined in a 100 mL flask containing a magnetic stir bar and sealed with a stopcock. The mixture is heated with stirring at 110–115° C. for 24 hours under 125 mm Hg vacuum. The reaction mixture at this point exhibits a weight loss which is consistent with the formation of HCl as a volatile reaction by-product.

EXAMPLE 10

Sweet Chocolate. A low calorie sweet chocolate may be prepared by blending

| Ingredient | parts |
| --- | --- |
| Cocoa Powder | 1.0 |
| Sugar | 1.0 |
| To this is added a portion of | |
| Example 5 Fat Mimetic | 1.0 |

Mix thoroughly and pass through a refiner to reduce the particles to desired size. The material is conched, and the remaining fat mimetic is added. The mixture is poured into molds and quench cooled. No tempering regiment is necessary.

EXAMPLE 11

Chocolate Chips. The chocolate prepared in Example 10 is deposited into nibs and processed in the usual process.

EXAMPLE 12

Chocolate Chip Cookies. Reduced calorie crisp chocolate chip cooking may be prepared by blending

| Ingredient | parts |
| --- | --- |
| Flour | 22.0 |
| Example 1 Fat Mimetic | 20.0 |
| Salt | 0.7 |
| Sodium Bicarbonate | 0.1 |
| Monocalcium Phosphate | 0.1 |
| Vanillin | 0.1 |
| Water | 8.0 |
| To this is added | |
| Sugar | 30.0 |
| which is mixed until dispersed. Then | |
| Example 11 Chocolate Chips | 19.0 | is added and mixed until just blended prior to depositing and baking the usual process.

EXAMPLE 13

Chewy Chocolate Chip Cookies. Chewy chocolate chip cookies may be prepared by combining

| Ingredient | parts |
|---|---|
| Sugar | 24.3 |
| Invert Sugar | 20.0 |
| Flour | 13.7 |
| Example 7 Fat Mimetic | 13.0 |
| Frozen Whole Eggs | 2.0 |
| Sodium Bicarbonate | 0.1 |
| Monocalcium Phosphate | 0.1 |
| Vanillin | 0.1 |
| Water | 7.7 |
| To this is added | |
| Example 11 Chocolate Chips | 19.0 | and mixed until just dispersed prior to depositing and baking in the usual process.

EXAMPLE 14

Sandwich Cookies. A base cake may be prepared by combining

| Ingredient | parts |
|---|---|
| Flour | 48.0 |
| High Fructose Corn Syrup | 12.0 |
| Sugar (6X) | 10.0 |
| Example 1 Fat Mimetic | 10.0 |
| Dutch Cocoa | 5.0 |
| Corn Syrup (42 D.E.) | 3.0 |
| Dextrose | 2.0 |
| Frozen Whole Eggs | 2.0 |
| Salt | 0.3 |
| Sodium Bicarbonate | 0.2 |
| Lecithin | 0.2 |
| Vanilla | 0.2 |
| Ammonium Bicarbonate | 0.1 |
| Water | 7.0 |
| mixing well, rotary molding, baking and cooling. | |
| A filler may be prepared by melting | |
| Example 5 Fat Mimetic | 37.0 |
| and adding | |
| Sugar 10X | 62.7 |
| Vanillin | 0.3 |

Cool filler to 78° F. and sandwich between base cakes in a ratio of 1 to 3.

EXAMPLE 15

Vanilla Wafers. Vanilla wafers may be prepared by combining and mixing well

| Ingredient | parts |
|---|---|
| Flour | 40.0 |
| Sugar (10X) | 28.0 |
| Example 3 Fat Mimetic | 13.0 |
| Frozen Whole Eggs | 6.0 |
| High Fructose Corn Syrup | 4.0 |
| Salt | 0.7 |
| Vanilla | 0.3 |
| Sodium Bicarbonate | 0.3 |
| Sodium Aluminum Phosphate | 0.1 |
| Ammonium Bicarbonate | 0.1 |
| Water | 7.5 | aerating, and depositing onto a baking surface and baking in the usual manner.

EXAMPLE 16

White Layer Cake. A white layer cake may be prepared by combining

| Ingredient | parts |
|---|---|
| Sugar | 30.0 |
| Flour | 25.0 |
| Frozen Whole Eggs | 16.0 |
| Example 3 Fat Mimetic | 14.7 |
| Nonfat Dry Milk | 13.0 |
| Sodium Bicarbonate | 0.7 |
| Vanilla | 0.4 |
| Salt | 0.2 | mixing well, panning off, and baking in the usual process.

EXAMPLE 17

Chocolate Icing. Chocolate icing may be prepared by blending, being careful not to incorporate air:

| Ingredient | parts |
|---|---|
| Sugar (12X) | 65.0 |
| Example 1 Fat Mimetic | 11.0 |
| Dutched cocoa | 10.5 |
| Nonfat Dry Milk | 4.0 |
| Frozen Egg Yolk | 4.0 |
| Salt | 0.25 |
| Vanilla | 0.25 |
| Water | 5.0 |

The icing can be used immediately or packaged and frozen for later use.

EXAMPLE 18

Butter Cream Icing. Butter cream icing is prepared by blending:

| Ingredient | g. |
|---|---|
| Sugar | 227.0 |
| Example 1 Fat Mimetic | 70.8 |
| Water | 28.4 |
| Non Fat Dry Milk | 14.0 |
| Emulsifier | 1.4 |
| Salt | 1.0 |
| Vanilla | 1.0 |

All of the ingredients are creamed in a mixer at medium speed.

EXAMPLE 19

Pie Crust. A pie crust may be prepared by blending

| Ingredient | parts |
|---|---|
| Flour | 58.0 |
| Whey | 1.5 |
| Salt | 1.5 |
| Sodium Steroyl-2 Lactylate | 1.0 |
| To this is added | |
| Water | 7.0 |
| Example 3 Fat Mimetic | 26.0 |
| High Fructose Corn Syrup | 5.0 |

The dough is mixed until uniform prior to pressing into a pie plate and baking in the usual process.

EXAMPLE 20

Lemon Pie Filling. A pie filling may be prepared by premixing

| Ingredient | parts |
|---|---|
| Sugar (4X) | 17.5 |
| Unmodified Corn Starch | 2.0 |
| Modified Corn Starch | 1.8 |
| To this is added | |
| Water | 60.0 |
| then Corn Syrup | 11.5 |
| Example 3 Fat Mimetic | 4.3 |
| Lemon Powder | 1.0 |
| Lemon Puree | 1.0 |
| Dry Whole Egg | 0.5 |
| Citric Acid | 0.2 |
| Salt | 0.2 |

The mixture is heated to starch gelatinization temperature and used immediately or canned.

EXAMPLE 21

Whipped Topping. A whipped topping may be prepared by premixing

| Ingredient | parts |
|---|---|
| Example 1 Fat Mimetic | 26.0 |
| with Mono- and Di-glycerides | 2.0 |
| An aqueous phase is prepared by dissolving | |
| Water | 46.6 |
| Sugar (4X) | 23.0 |
| Dextrose | 1.0 |
| Polysorbate 60 | 0.7 |
| Sorbitan Monostearate | 0.3 |
| Carageenan | 0.2 |
| Guar Gum | 0.1 |
| Vanilla | 0.1 |

The oil blend is then added to the aqueous phase with high agitation. The topping can be packaged and refrigerated or frozen.

EXAMPLE 22

Pudding. Pudding can be prepared from the following formulation:

| Ingredient | parts |
|---|---|
| Milk | 67 |
| Sugar | 11 |
| Starch | 5 |
| Water | 9 |
| Flavor | 3 |
| Example 1 Fat Mimetic | 5 |

The ingredients can be blended together and heated to form a pudding.

EXAMPLE 23

Soda Crackers. Soda crackers may be prepared by pre-mixing ¼ of

| Ingredient | parts |
|---|---|
| Flour | 70.0 |
| Yeast | 0.2 | and sufficient water to make a dough. This is fermented for 24 hours. To the remaining flour and yeast, the following is added and blended:

| Ingredient | parts |
|---|---|
| Water | 20.0 |
| Malt Syrup | 0.69 |
| Sodium Bicarbonate | 0.40 |
| Malt | 0.01 |
| After the ferment is added and mixed again, the blend is proofed for 8 hours, sheeted, and baked. Afterwards, | |
| Example 1 Fat Mimetic | 7.0 |
| is applied to the crackers with | |
| Salt | 1.7 |
| prior to packaging. | |

EXAMPLE 24

Sprayed Crackers. A dough prepared from

| Ingredient | parts |
|---|---|
| Flour | 100.0 |
| Sugar | 5.0 |
| Malt | 1.5 |
| Example 1 Fat Mimetic | 7.5 |
| Salt | 1.0 |
| Sodium Bicarbonate | 0.9 |
| Nonfat Dry Milk | 2.5 |
| High Fructose Corn Syrup | 2.5 |
| Monocalcium Phosphate | 0.75 |
| Water | 28.0 | is sheeted, stamped, and baked to produce a cracker product, then sprayed with the Example 1 Fat Mimetic prior to packaging.

EXAMPLE 25

Peanut Butter. Peanut butter may be prepared by mixing

| Ingredient | parts |
|---|---|
| Example 1 Fat Mimetic | 35.0 |
| with Peanut Flavor | 2.0 |
| Then Corn Syrup Solids | 12.0 |
| Salt | 1.0 |
| High Fructose Corn Syrup | 10.0 |
| are added while agitating. When well blended, add | |
| Defatted Peanut Flour | 40.0 |
| mix and package. | |

EXAMPLE 26

Ice Cream. Vanilla ice cream may be prepared by mixing

| Ingredient | parts |
|---|---|
| Sugar (10 X) | 15.0 |
| Nonfat Dry Milk | 3.9 |
| Salt | 0.4 |
| into Water | 39.0 |
| for 3 minutes. Then add melted | |
| Example 4 Fat Mimetic | 28.4 | and cook to 200° F. while mixing. Hold for 1 minute. Cool to 160° F., and add

| Sugared Egg Yolks | 12.5 |
|---|---|
| Vanilla Extract | 0.8 | and mix 1 minute. Cool and freeze to desired overrun.

EXAMPLE 27

Filled Cream. To make a "filled cream" composition, homogenize about

| Ingredient | kg |
|---|---|
| Example 4 Fat Mimetic | 30.0 |
| Skim Milk | 69.9 |
| Polysorbate 80 | 0.1 | in a conventional dairy homogenizer.

EXAMPLE 28

Filled Milk. To prepare a "filled milk" composition, combine about

| Ingredient | parts |
|---|---|
| Example 27 Filled Cream | 10 |
| Skim Milk | 90 | and rehomogenize.

EXAMPLE 29

Low Calorie Milk. A low calorie "whole milk" may be prepared by combining

| Ingredient | parts |
|---|---|
| Nonfat Milk | 96.4 |
| Example 1 Fat Mimetic | 3.5 |
| Lecithin | 0.1 | mixing and homogenizing.

EXAMPLE 30

Cream Cheese. To make an imitation cream cheese, and

| Ingredient | parts |
|---|---|
| Water | 53.0 |
| to Calcium Caseinate | 6.7 |
| Buttermilk Powder | 3.9 |
| Emulsifiers | 0.2 |
| Xanthan Gum | 0.2 |
| and mix three minutes. Melt | |
| Example 1 Fat Mimetic | 35.5 |
| and cook to 200° F. while mixing. Hold for one minute. Then cool to 150° F. and add | |
| Flavor, Acid and Color | 0.5 | and mix one minute. Fill, then cool and store.

EXAMPLE 31

Cheddar-Style Cheese. To make Cheddar-style cheese, homogenize

| Ingredient | parts |
|---|---|
| Nonfat Milk | 75.0 |
| Low Temperature Nonfat Dry Milk | 4.0 |
| Example 1 Fat Mimetic | 20.0 |
| To this is added | |
| Salt | 0.7 |
| Lactic Acid Culture | 0.3 |

The mixture is fermented and pressed to a final composition of approximately 37.0% moisture, 63.0% total solids, and 32.0% fat mimetic.

EXAMPLE 32

Process Pimento Cheese Food. Processed pimento cheese food may be prepared by melting

| Ingredient | % |
|---|---|
| Example 31 Cheddar Cheese | 43.0 |
| and Swiss cheese | 44.0. |
| Into this is blended | |
| Dehydrated Pimento | 0.3 |
| and Water | 12.7, | and the mixture is cast into blocks.

EXAMPLE 33

Imitation Sour Cream. An imitation sour cream may be prepared by adding

| Ingredient | % |
|---|---|
| Water | 75.8 |
| to Modified Starch | 2.0 |
| Avicel | 1.0 |
| Distilled Monoglyceride | 0.7 |
| and Polysorbate 60 | 0.3 |
| and mixing three minutes. To this is added | |
| Example 4 Fat Mimetic | 16.5 |
| Condensed Skim Milk | 3.5, |
| and the mixture is mixed three minutes, cooked to 195° F., and held five minutes. This may then be cooled to 60° F., and | |
| Flavors and Acids | 0.2 | added, followed by filling in the usual process.

EXAMPLE 34

Mayonnaise. Mayonnaise may be prepared by adding

| Ingredient | % |
|---|---|
| Water | 5.0 |
| to Sugar | 1.5 |
| and Spices | 3.5 |
| and mixing three minutes. To this is added | |
| Salted Egg Yolks | 8.0 |
| followed by mixing two minutes, adding | |
| Example 1 Fat Mimetic | 80.0 |
| then 120 Distilled Vinegar | 2.0. |

The mixture is blended 3 minutes and passed through a colloid mill set at 60 prior to filling in the usual process.

EXAMPLE 35

Salad Dressing. Salad dressing may be prepared by adding

| Ingredient | parts |
|---|---|
| Water | 29.0 |
| to Sugar | 12.0 |
| and Spices | 4.5 |
| and mixing three minutes. Then | |
| Salted Egg Yolks | 5.5 |
| and Modified Starch | 3.0 |
| are added and mixed two minutes. To the aqueous mixture are added | |
| Example 1 Fat Mimetic | 40.0 |

-continued

| Ingredient | parts |
|---|---|
| then 120 Distilled Vinegar | 6.0 |

The mixture is then mixed three minutes and passed through a colloid mill set at 60 prior to filling in the usual process.

EXAMPLE 36

Italian Dressing. To make Italian dressing, add

| | Ingredient | parts |
|---|---|---|
| | Sugar | 4.0 |
| | Xanthan Gum | 0.12 |
| to | Water | 21.5 | at 125–130° F. and mix three minutes. Then add

| | Ingredient | parts |
|---|---|---|
| | Garlic Vinegar Puree | 1.5 |
| | Lemon Juice | 4.0 |
| | White Vinegar (120) | 13.0 | and mix three minutes. Add

| Ingredient | parts |
|---|---|
| Salt | 4.5 |
| Minced Garlic | 0.75 |
| Minced Onion | 0.50 |
| Red Bell Peppers | 0.05 |
| B.I. Spice Blend | 0.08 | and mix three minutes. Fill this aqueous phase 50% by weight with

| Ingredient | parts |
|---|---|
| Example 1 Fat Mimetic | 50.0 | by weight.

EXAMPLE 37

French Dressing. French dressing may be prepared by adding

| | Ingredient | parts |
|---|---|---|
| | Water | 31.09 |
| to | Sugar | 15.00 |
| | Salt | 2.50 |
| | Spices | 2.40 |
| | Xanthan Gum | 0.25 |
| | Alginate | 0.14 |
| | Polysorbate 60 | 0.12 | and mixing three minutes. Then

| | Ingredient | parts |
|---|---|---|
| | 120 Distilled Vinegar | 12.00 |
| and | Example 1 Fat Mimetic | 36.50 | are added, mixed three minutes, and homogenized at 500 psi prior to filling in the usual process.

EXAMPLE 38

Dijon Mustard. A Dijon-style mustard may be prepared by combining

| | Ingredient | parts |
|---|---|---|
| | Dry White Wine | 66.1 |
| with | Water | 5.0 | and bringing to a boil. To this aqueous phase is added

| Ingredient | parts |
|---|---|
| Ground, Defatted Yellow Mustard Seed | 12.4 |
| Example 1 Fat Mimetic | 6.1 |
| Honey | 6.6 |
| Onion Powder | 2.0 |
| Salt | 1.3 |
| Garlic Powder | 0.3 |
| Mustard Oleo Resin | 0.2 |

The mixture is well blended, pasteurized, and packaged.

EXAMPLE 39

Margarine. A margarine may be prepared by emulsifying

| | parts |
|---|---|
| Oil Phase Ingredients | |
| Example 1 Fat Mimetic | 68.6 |
| Liquid Corn Oil | 0.55 |
| Partially Hydrogenated Corn Oil | 0.45 |
| Lecithin | 0.30 |
| Mono- and Di-Glycerides | 0.21 |
| Margarine Flavor and Color | 0.0062 |
| with Aqueous Phase Ingredients | |
| Water | 25.8 |
| Whey | 1.00 |
| Salt | 2.00 |
| Sodium Benzoate | 0.086 |
| Potassium sorbate | 0.066 |
| CaEDTA | 0.0015 | and passing the emulsion through a cool scraped surface heat exchanger in the usual process.

EXAMPLE 40

Low Fat Spread. A 60% table spread may be prepared by emulsifying

| | parts |
|---|---|
| Oil Phase Ingredients | |
| Example 1 Fat Mimetic | 59.58 |
| Lecithin | 0.20 |
| Monoglycerides from 5 IV Hydrogenated Soybean Oil | 0.20 |
| Beta-carotene and Vitamin A Palmitate in Corn Oil | 0.005 |
| Flavor | 0.010 |
| with Aqueous Phase Ingredients | |
| Water | 36.865 |
| Salt | 2.00 |
| Whey | 1.00 |
| Potassium Sorbate | 0.10 |
| Phosphoric Acid | 0.04 | and passing the emulsion through a cool scraped surface heat exchanger in the usual process.

EXAMPLE 41

Shortening. A shortening may be prepared by mixing

| Ingredient | parts |
|---|---|
| Example 1 Fat Mimetic | 95.0 |
| with Soybean Oil (70 IV) Mono- and Diglycerides | 5.0 |

EXAMPLE 42

Puff Pastry Shortening. A puff pastry shortening may be prepared by homogenizing

| Ingredient | parts |
|---|---|
| Example 1 Fat Mimetic | 68.0 |
| Example 3 Fat Mimetic | 22.0 |
| Soybean Lecithin | 0.1 |
| Mono- and Diglycerides (0 IV) | 0.2 |
| with Water | 8.2 |

EXAMPLE 43

Frying Oil. A frying oil may be prepared by adding 1 ppm polydimethylsiloxane to the Fat Mimetic of Example 1.

EXAMPLE 44

Potato Chips. Whole peeled potatoes may be sliced, washed in water, and fried in the Frying Oil of Example 43 at 375° F. to desired color. The excess oil is shaken off and the chips are salted. The finished product contains about 35% fat mimetic.

EXAMPLE 45

Bologna. To make bologna, chop together

| Ingredient | parts |
|---|---|
| Boneless Mutton | 40.0 |
| Pork Hearts | 15.0 |
| Beef Trimmings (75/25) | 10.0 |
| Pork Blade Meat | 5.0 |
| adding ice to control temperature. Then add | |
| Seasoning | 7.0 |
| Example 1 Fat Mimetic | 13.0 |
| and Water/Ice | 10.0 |

The mixture can be stuffed into casings, smoked, and packaged.

EXAMPLE 46

Italian Sausage. To make Italian sausage, chop

| Ingredient | parts |
|---|---|
| Lean Beef | 52.6 |
| Lean Pork | 26.3 |
| together. Pre-blend | |
| Example 1 Fat Mimetic | 9.8 |
| Salt | 1.7 |
| Chili Powder | 1.3 |
| Paprika | 0.9 |
| Coriander | 0.01 |
| Nutmeg | 0.01 |
| Ground Caraway | 0.005 |
| Celery | 0.005 |
| and add to meats. Add | |
| Pimento | 7.37 | with juice and chop until well mixed. Brind through ⅜" plate, stuff into casings and cook at 150° F. for 30 minutes. Smoke and package.

EXAMPLE 47

Cubed Soup Stock. To make cubed soup stock, blend

| Ingredient | parts |
|---|---|
| Salt | 67.0 |
| Dry Beef Broth | 25.0 |
| Celery Salt | 1.0 |
| Melt | |
| Example 3 Fat Mimetic | 7.0 |
| Salt | 1.5 | and spray into the mixing dry ingredients. Press into cubes and package.

EXAMPLE 48

Pet Food. A dry pet food may be prepared by mixing

| Ingredient | parts |
|---|---|
| Ground Wheat Middlings | 56.9 |
| Meat and Bone Meal | 15.0 |
| Defatted Soya Meal | 15.0 |
| Sugar | 3.0 |
| Sodium Aluminum Phosphate | 0.4 |
| Sodium Bicarbonate | 0.4 |
| Vitamin Mix | 0.2 |
| To this is added | |
| Example 1 Fat Mimetic | 1.0 | and water sufficient for processing. The ingredients are remixed and cooker extruded. The product is baked/dried to approximately 2.5% moisture and surface coated with

| Example 1 Fat Mimetic | 9.0 |
|---|---| prior to packaging.

EXAMPLE 49

Breakfast Sausage. To make breakfast sausage, premix

| Ingredient | parts |
|---|---|
| Salt | 1.7 |
| White Pepper | 0.34 |
| Sugar | 0.18 |
| Sage | 0.17 |
| Ginger | 0.06 |
| Cardamon | 0.02 |
| Marjoram | 0.02 |
| Savory | 0.01 |
| Chop | |
| Trimmed Cali Pork Butts | 45.0 |
| Example 3 Fat Mimetic | 35.0 |
| Ham Fat | 17.5 | with spices until blended. Brind through 3/16" plate. Package and refrigerate until use.

EXAMPLE 50

Corn Puff Cereal. To make corn puff cereal, mix

| Ingredient | parts |
|---|---|
| Corn Flour | 48.5 |
| Defatted Corn Bran | 25.0 |
| Sugar (4x) | 7.5 |
| Rice Flour | 6.0 |
| together. To this is added | |
| Example 1 Fat Mimetic | 5.5 |
| Honey | 7.5 |

The mixture is blended until uniform, cooker extruded to desired shape, and dried to a moisture content of approximately 2% prior to packaging.

EXAMPLE 51

Dry Pancake Mix. A dry pancake mix may be prepared by combining

| Ingredient | parts |
|---|---|
| Soft Wheat Flour | 58.0 |
| Corn Flour | 11.0 |
| Rye Flour | 10.0 |
| Sugar (6X) | 7.0 |
| Nonfat Dry Milk | 3.5 |
| Sodium Bicarbonate | 1.8 |
| Sodium Acid Pyrophosphate | 1.5 |
| Dry Whole Egg | 1.0 |
| Monocalcium Phosphate | 0.2 |
| Then | |
| Example 1 Fat Mimetic | 6.0 | is sprayed onto the dry ingredients as they mix. The mixture is then blended and packaged.

EXAMPLE 52

Bread. To make bread, combine

| Ingredient | parts |
|---|---|
| Flour | 52.0 |
| Water | 32.0 |
| Sugar | 5.0 |
| Example 3 Fat Mimetic | 4.7 |
| Yeast | 2.5 |
| Nonfat Dry Milk | 2.5 |
| Salt | 1.3 |

The mixture is proofed four hours, punched down, panned, and proofed until desired volume is achieved prior to baking, slicing, and packaging in the usual manner.

EXAMPLE 53

Heat and Serve Rolls. To make heat and serve rolls, combine

| Ingredient | parts |
|---|---|
| Sugar | 5.7 |
| Example 3 Fat Mimetic | 5.7 |
| Frozen Whole Eggs | 2.9 |
| Nonfat Dry Milk | 1.9 |
| Yeast | 1.4 |
| Salt | 0.9 |
| Water | 33.5 |
| and blend well. Add | |
| Flour | 48.0 | and mix. Proof for 4 hours. De-gas, divide into rolls, package, and freeze.

EXAMPLE 54

Coffee Whitener. A coffee whitener may be prepared by premixing

| Ingredient | parts |
|---|---|
| Corn Syrup Solids | 43.0 |
| Sodium Caseinate | 8.7 |
| Mono- and Diglycerides | 3.0 |
| Dipotassium Phosphate | 1.0 |
| Vanillin | 0.2 |
| While blending continues | |
| Example 1 Fat Mimetic | 44.0 |
| Butter Flavor | 0.1 | are added, and the mixture is packaged.

EXAMPLE 55

Fudge Base. A fudge base suitable as a milk mix (or topping may be prepared by mixing

| Ingredient | parts |
|---|---|
| Corn Syrup | 26.0 |
| Corn Starch | 2.0 |
| Vanilla | 2.0 |
| To this are added | |
| Cocoa Powder | 25.0 |
| Example 3 Fat Mimetic | 30.0 |
| Example 1 Fat Mimetic | 15.0 |

The mixture is blended well and heated to pasteurizing temperature before packaging.

EXAMPLE 56

Caramel. To make caramel, mix

| Ingredient | parts |
|---|---|
| Sugar (4X) | 11.0 |
| Invert Sugar | 10.0 |
| Condensed Skim Milk | 30.0 |
| Then | |
| Corn Syrup (64 D.E.) | 40.0 |
| Example 4 Fat Mimetic | 8.0 |
| Salt | 1.0 |

Cook to about 240° F. and caset into a final product or use as an ingredient in other confections.

EXAMPLE 57

Bubble Gum. A gum base may be made by melting together

| Ingredient | parts |
|---|---|
| Gum Resin | 35 |
| Calcium Carbonate Filler | 30 |
| Example 4 Fat Mimetic | 23 |
| Elastomer | 12 |
| To 25% of the base add | |
| Corn Syrup (63 D.E.) | 20 |
| Glycerol | 5 |
| Sugar (12X) | 49 |
| Color and Flavor | 1 |

The mixture can be cooled and cut to size.

EXAMPLE 58

Milk Liqueur. To make a shelf stable milk liqueur, blend

| Ingredient | parts |
|---|---|
| Sugar | 21.0 |
| Water | 79.0 |
| until dissolved. To 25% of this sugar solution, add | |
| Ethanol | 47.0 |
| Water | 28.0 |
| to make a liqueur stock. To make the milk liqueur, mix | |
| Liqueur Stock | 90.90907 |
| Nonfat Milk | 7.90513 |
| Example 1 Fat Mimetic | 1.18577 |
| Orange Oil | 0.000016 |
| Cinnamon Oil | 0.000008 |
| Anise Oil | 0.000004 |
| Clove Oil | 0.000004 |
| Rose Oil | 0.000004 |

Mix, homogenize, and bottle.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention which is defined by the following claims.

We claim:

1. An edible composition comprising a fat mimetic compound of the following formula:

$$R-(C(=O)-O-R')_n$$

wherein R is a linking covalent bond, aliphatic group, or glycolic group; n is 2 to 6; and each R' comprises a residue defined by the formula:

$$\begin{array}{c}(CX_a)_b Q_d \\ | \\ (X-C-Q)_e \\ | \\ (CX_f)_g Q_h\end{array}$$

where:
C is a carbon atom;
X is a bridging bonding valence, hydrogen, or substituted or unsubstituted bridging or terminal lower aliphatic group, the various X groups being the same or different, wherein one X is a bridging bonding valence or a substituted or unsubstituted bridging lower aliphatic group;

Q is $-C(=O)-O-R''$ (carboxylate), $-R'''-C(=O)-O-R''$ (alkylcarboxylate), $-O-C(=O)-R''$ (carboxy), $-R'''-O-C(=O)-R''$ (alkylcarboxy), $-O-R''$(alkoxy), or $-R'''-O-R''$(alkylalkoxy)- radicals, wherein at least one of the Q radicals is other than carboxy;
R'' is substituted or unsubstituted aliphatic, ether, or ester group, the various R' and R'' groups respectively being the same or different;
R''' is lower alkylene;
wherein there is only one bridging valence or group per R' group;
and where
a = 0 to 3;
b = 0 to 4;
d = 0 to 2;
e = 0 to 5;
f = 0 to 3;
g = 0 to 4;
h = 0 to 2,
where at least one of d, e, or h is at least 1.

2. A compound according to claim 1 wherein each R' group contains from 1 to 3 Q radicals.
3. A compound of claim 1 wherein n is 2.
4. A compound according to claim 3 wherein there are a total of four Q radicals.
5. A compound of claim 1 wherein n is 3.
6. A compound according to claim 5 wherein there are a total of six Q radicals.
7. A compound according to claim 1 wherein at least one Q comprises carboxylate or alkylcarboxylate.
8. A compound according to claim 1 wherein at least one Q comprises carboxy or alkylcarboxy.
9. A compound according to claim 1 wherein at least one Q comprises alkoxy or alkylalkoxy.
10. A compound according to claim 1 wherein R comprises an aliphatic or glycolic group containing up to 10 carbons.
11. A compound according to claim 10 wherein R comprises an aliphatic group containing from 1 to 8 carbons.
12. A compound according to claim 4 wherein at least two of the Q radicals are carboxy or alkylcarboxy radicals of the formula $$-O-C(=O)-R''\quad \text{or}\quad -R'''-O-C(=O)-R''$$

wherein $$-O-C(=O)-R''$$

is the residue of a fatty acid derived from natural fat.

13. A compound according to claim 12 wherein at least one Q radical is alkylcarboxy.
14. A compound according to claim 12 wherein at least one Q radical is a carboxylate or alkylcarboxylate radical of the formula $$-C(=O)-O-R''\quad \text{or}\quad -R'''-C(=O)-O-R''$$

wherein $$-C(=O)-O-R''$$

is the residue of a fatty alcohol.

15. A compound according to claim 1 which contains at least one R''' as methylene.
16. The compound of claim 1 wherein:
a = 0 to 2,
b = 0 to 1,
e = 1 to 2,
f = 0 to 2, and
g = 0 to 1.

17. An edible composition comprising a fat mimetic composition of the following formula:

$$R(-C(=O)-O-R')_2$$

wherein R is a linking group selected from the group consisting of —(CH$_2$)$_m$— and —CH$_2$—O—CH$_2$—, where m is 1 to 8; and each R' is the same and selected from the group consisting of

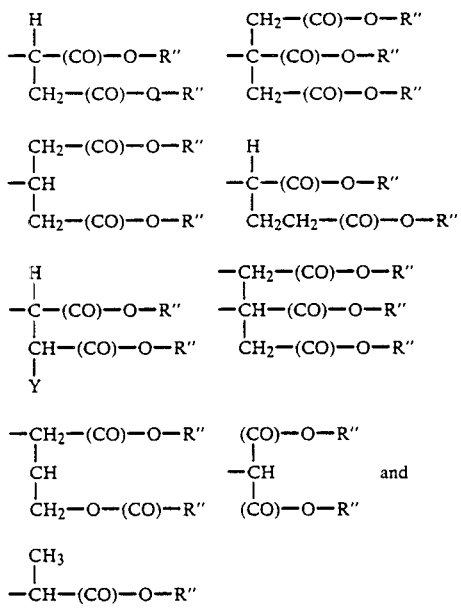

where each R" is, independently, an aliphatic group having 1 to 30 carbons, —CH(CH$_3$)CH$_2$O—A or —CH$_2$CH(CH$_3$)O—A, where A is an aliphatic group having 1 to 30 carbons; and Y is —OH, —(-CO)—O—R", or —O—(CO)—R".

18. A composition according to claim 17 wherein R has 2 to 4 carbons.

19. A composition according to claim 17 wherein each R", independently, has 8 to 22 carbons.

20. The composition of claim 19 wherein R" is derived from fatty acids selected from the group consisting of acetic, propionic, butyric, caproic, caprylic, pelargonic, capric, undecanoic, lauric, myristic, palmitic, margaric, stearic, arachidic, behenic, lignoceric, cerotic, montanic, mellissic, palmitoleic, oleic, vaccenic, linoleic, linolenic, eleostearic, arachidonic, nervonic, eicosapentaenoic, decosatetraenoic, decosapentaenoic, decosahexaenoic, and their alcohol counterparts.

21. The composition of claim 19 wherein R", independently, is derived from an oil selected from the group consisting of non-hydrogenated, partially hydrogenated or fully hydrogenated soybean safflower, sunflower, sesame, peanut, corn, olive, rice bran, canola, babassu nut, coconut, palm, palm kernel, lupin, nastrutium seed, mustard seed, cottonseed, low erucic rapeseed, butter or marine oils, and plant waxes.

22. The composition of claim 19 wherein R" is derived from tallow or lard.

23. A food product containing a fat mimetic compound according to claim 17 in an amount sufficient to mimic conventional triglyeride fat.

24. The food product according to claim 23, wherein said food product is selected from the group consisting of frozen desserts, puddings and pie fillings, whipped toppings, margarine substitutes or blends, flavored bread or biscuit spreads, sour cream, mayonnaise, salad dressing, mustard, cheese products, filled dairy products, coffee whiteners, dairy or non-dairy cheese spreads, ice cream mixers, coffee lighteners, flavored dips, cubed soup stock, peanut butter, pancake mixes, egg substitutes, frying fats and oils, shortening, bakery products, cookies, wafers, crackers, cakes, pie crusts, cereals, soup stock, chocolate, liquer, icings, frostings and fillings, pet food, candy, liqueurs, fudge, caramel, potato chips, and meat substitutes or extenders.

25. An edible composition comprising a fat mimetic composition of the following formula:

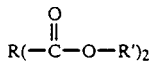

wherein R is a linking group selected from the group consisting of —(CH$_2$)$_m$— and —CH$_2$—O—CH$_2$—, where m is 1 to 8; and each R' is different and independently selected from the group consisting of

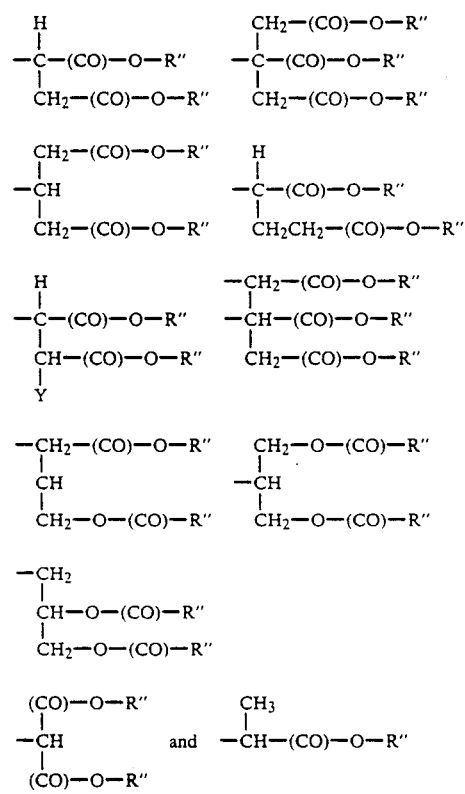

where each R" is, independently, an aliphatic group having 1 to 30 carbons, —CH(CH$_3$)CH$_2$O—A or —CH$_2$CH(CH$_3$)O—A, where A is an aliphatic group having 1 to 30 carbons; and Y is —OH, —(-CO)—O—R", or —O—(CO)—R".

26. A composition according to claim 25 wherein R has 2 to 4 carbons.

27. A composition according to claim 25 wherein each R", independently, has 8 to 22 carbons.

28. The composition of claim 27 wherein R" is derived from fatty acids selected from the group consisting of acetic, propionic, butyric, caproic, caprylic, pelargonic, capric, undecanoic, lauric, myristic, palmitic, margaric, stearic, arachidic, behenic, lignoceric, cerotic, montanic, mellissic, palmitoleic, oleic, vaccenic, linoleic, linolenic, eleostearic, arachidonic, nervonic, eicosapentaenoic, decosatetraenoic, decosapentaenoic, decosahexaenoic, and their alcohol counterparts.

29. The composition of claim 27 wherein R″, independently, is derived from an oil selected from the group consisting of non-hydrogenated, partially hydrogenated or fully hydrogenated soybean safflower, sunflower, sesame, peanut, corn, olive, rice bran, canola, babassu nut, coconut, palm, palm kernel, lupin, nastrutium seed, mustard seed, cottonseed, low erucic rapeseed, butter or marine oils, and plant waxes.

30. The composition of claim 27 wherein R″ is derived from tallow or lard.

31. A food product containing a fat mimetic compound according to claim 25 in an amount sufficient to mimic conventional triglyceride fat.

32. The food product according to claim 31, wherein said food product is selected from the group consisting of frozen desserts, puddings and pie fillings, whipped toppings, margarine substitutes or blends, flavored bread or biscuit spreads, sour cream, mayonnaise, salad dressing, mustard, cheese products, filled dairy products, coffee whiteners, dairy or non-dairy cheese spreads, ice cream mixers, coffee lighteners, flavored dips, cubed soup stock, peanut butter, pancake mixes, egg substitutes, frying fats and oils, shortening, bakery products, cookies, wafers, crackers, cakes, pie crusts, cereals, soup stock, chocolate, liqueur, icings, frostings and fillings, pet food, candy, liqueurs, fudge, caramel, potato chips, and meat substitutes or extenders.

* * * * *

UNITED STATES PATENT AND TRADEMARK OFFICE
CERTIFICATE OF CORRECTION

PATENT NO.  : 5,064,678

DATED       : November 12, 1991

INVENTOR(S) : Klemann et al.

It is certified that error appears in the above—identified patent and that said Letters Patent is hereby corrected as shown below:

At col. 4, line 65, insert --10-- immediately following first occurrence of "to".

At col. 4, line 68, insert --formula:-- immediately following "following".

Signed and Sealed this

Sixth Day of April, 1993

Attest:

STEPHEN G. KUNIN

Attesting Officer

Acting Commissioner of Patents and Trademarks